United States Patent
Bares et al.

(10) Patent No.: US 9,677,635 B2
(45) Date of Patent: Jun. 13, 2017

(54) FRICTION MATERIAL

(71) Applicant: BorgWarner Inc., Auburn Hills, MI (US)

(72) Inventors: Jason Bares, Rochester, MI (US); Robert C. Lam, Rochester, MI (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 13/953,235

(22) Filed: Jul. 29, 2013

(65) Prior Publication Data
US 2015/0031787 A1 Jan. 29, 2015

(51) Int. Cl.
*F16D 69/02* (2006.01)

(52) U.S. Cl.
CPC .... *F16D 69/026* (2013.01); *F16D 2200/0069* (2013.01)

(58) Field of Classification Search
CPC ............... F16D 69/023; F16D 69/026; F16D 2200/0069; C08J 5/047
USPC .......................................................... 523/156
See application file for complete search history.

(56) References Cited

U.S. PATENT DOCUMENTS

| | | | |
|---|---|---|---|
| 3,270,846 A | 9/1966 | Arledter et al. | |
| 3,326,822 A | 6/1967 | Albertson | |
| 3,390,750 A | 7/1968 | Albertson | |
| 3,896,075 A * | 7/1975 | Longley | 523/153 |
| 4,267,016 A | 5/1981 | Okazaki et al. | |
| 4,373,037 A | 2/1983 | Washabaugh | |
| 4,743,634 A * | 5/1988 | Royer | 523/150 |
| 5,110,678 A | 5/1992 | Narukawa et al. | |
| 5,268,398 A | 12/1993 | Nakagawa et al. | |
| 5,474,842 A * | 12/1995 | Hoiness | C09K 3/1028 428/297.4 |
| 5,516,816 A * | 5/1996 | Samuels | F16D 69/026 523/149 |
| 5,573,579 A * | 11/1996 | Nakanishi | F16D 69/026 106/36 |
| 5,676,577 A | 10/1997 | Lam et al. | |
| 5,707,905 A | 1/1998 | Lam et al. | |
| 5,753,356 A | 5/1998 | Lam et al. | |
| 5,856,244 A | 1/1999 | Lam et al. | |
| 5,858,883 A | 1/1999 | Lam et al. | |
| 5,866,636 A | 2/1999 | Nitto et al. | |
| 5,958,507 A | 9/1999 | Lam et al. | |
| 5,998,307 A | 12/1999 | Lam et al. | |
| 6,060,536 A | 5/2000 | Matsumoto et al. | |
| 6,130,176 A | 10/2000 | Lam | |
| 6,630,416 B1 | 10/2003 | Lam et al. | |
| 6,875,711 B2 | 4/2005 | Chen et al. | |
| 7,214,153 B2 | 5/2007 | Simpson | |
| 7,247,361 B2 | 7/2007 | Dong | |
| 7,439,418 B2 | 10/2008 | Mitta et al. | |
| 7,537,824 B2 | 5/2009 | Dong | |
| 7,696,261 B2 | 4/2010 | Lam | |
| 7,749,562 B1 | 7/2010 | Lam et al. | |
| 7,806,975 B2 | 10/2010 | Lam et al. | |
| 8,021,744 B2 | 9/2011 | Lam et al. | |
| 8,367,767 B1 * | 2/2013 | Jafri et al. | |
| 2004/0030000 A1 * | 2/2004 | Takeuchi et al. | 523/155 |
| 2004/0033341 A1 | 2/2004 | Lam et al. | |
| 2004/0043193 A1 | 3/2004 | Chen et al. | |
| 2004/0043243 A1 | 3/2004 | Chen et al. | |
| 2004/0081813 A1 | 4/2004 | Dong | |
| 2004/0247847 A1 | 12/2004 | Nogayoshi et al. | |
| 2005/0064778 A1 | 3/2005 | Lam et al. | |
| 2005/0074595 A1 | 4/2005 | Lam et al. | |
| 2005/0075019 A1 | 4/2005 | Lam et al. | |
| 2005/0075021 A1 | 4/2005 | Lam et al. | |
| 2005/0075022 A1 | 4/2005 | Lam | |
| 2005/0075413 A1 * | 4/2005 | Lam | 523/149 |
| 2005/0075414 A1 | 4/2005 | Lam et al. | |
| 2005/0191477 A1 | 9/2005 | Dong | |
| 2005/0281971 A1 * | 12/2005 | Lam | F16D 69/026 428/36.4 |
| 2006/0008635 A1 | 1/2006 | Dong et al. | |
| 2006/0009541 A1 | 1/2006 | Chen et al. | |
| 2006/0019080 A1 | 1/2006 | Lam et al. | |
| 2006/0019085 A1 | 1/2006 | Lam et al. | |
| 2006/0241207 A1 | 10/2006 | Lam et al. | |
| 2007/0142500 A1 | 6/2007 | Shao et al. | |
| 2008/0160260 A1 | 7/2008 | Wada et al. | |
| 2008/0184628 A1 * | 8/2008 | Sugai | B01J 2/16 51/298 |
| 2009/0048369 A1 | 2/2009 | Newcomb et al. | |
| 2009/0267250 A1 * | 10/2009 | Inada et al. | 264/15 |
| 2009/0324887 A1 | 12/2009 | McCord et al. | |
| 2010/0304631 A1 | 12/2010 | Dong et al. | |

FOREIGN PATENT DOCUMENTS

| | | |
|---|---|---|
| CN | 103451778 A | 12/2013 |
| GB | 819123 A | 8/1959 |

OTHER PUBLICATIONS

MEsh to Micron COnversion Chart, pp. 1-2, obtained online from: http://www.showmegold.org/news/Mesh.htm.*
Thomas P. Dolley, Diatomite, U.S. Geological Survey Minerals Yearbook, 2000, pp. 25.1-25.4.*
International Search Report and Written Opinion dated Nov. 24, 2014; Application No. PCT/US2014/047117; 14 pages.
Supplementary Partial European Search Report for EP14832530 dated Feb. 1, 2017; 4 pages.
English language abstract and machine-assisted English translation extracted from espacenet.com database on Feb. 16, 2017, 18 pages.

* cited by examiner

*Primary Examiner* — Alexander Kollias
(74) *Attorney, Agent, or Firm* — Howard & Howard Attorneys PLLC

(57) ABSTRACT

One variation includes a friction material wherein the friction material may be fabricated from fibers, particles, a chemical binder, and a resin bonding agent wherein the particles are aggregated.

27 Claims, 3 Drawing Sheets

FRICTION MATERIAL

TECHNICAL FIELD

The field to which the disclosure generally relates to includes friction materials, including, but not limited to friction materials used in wet friction clutch modules in automotive transmissions, such as, but not limited to passenger vehicles, motor cycles, rough terrain vehicles, and truck vehicles.

BACKGROUND

Currently, most if not all friction materials used in a wet clutch contain ingredient fillers that are evenly distributed throughout the material.

SUMMARY OF ILLUSTRATIVE VARIATIONS OF THE INVENTION

One variation of the invention shows a product comprising a friction material that may include fibers, particles, a chemical binder, and a resin bonding agent, wherein the particles are aggregated into regions of groups of particles throughout the friction material wherein the amount and arrangement of regions of groups of particles results in an increase in average permeability of 2 to 10 times compared to a composition with single particles instead of regions of groups particles.

Another variation of the invention shows a product comprising a friction material that may include aramid fibers, carbon fibers, graphite particles, and diatomaceous earth particles, wherein the percentage weight of aramid fibers may be between 20% and 60%, wherein the percentage weight of carbon fiber may be between 5% and 20%, wherein the percentage weight of the graphite particles may be between 5% and 25%, wherein the percentage weight of the diatomaceous earth particles may be between 5% to 30%, and wherein at least one of the graphite particles or the diatomaceous earth particles may be aggregated.

Another variation of the invention shows a product comprising a friction material that may include a plurality of fibers, a bonding agent, and a plurality of bonded groups including a plurality of particles bonded together, wherein each of the plurality of bonded groups has a diameter ranging from 10-500 µm.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
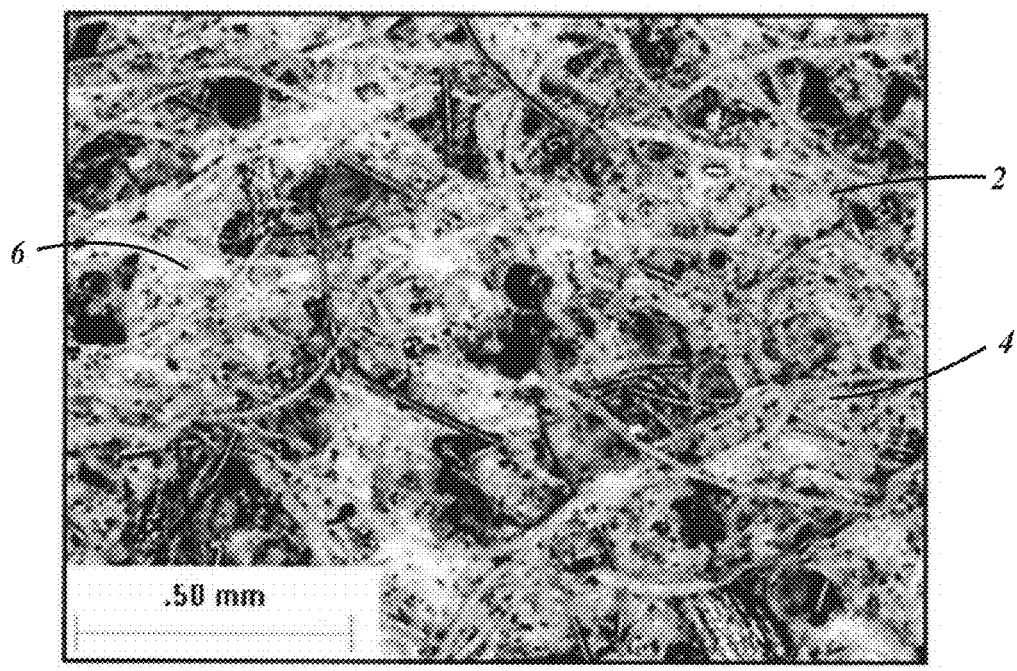
FIG. 1 is a front view of one variation of the friction material.

A friction material 2 is provided in FIG. 1. Such a friction material 2 may be useful in applications such as wet clutch lining of a vehicle, or may be used for other applications. The friction material 2 may be paper-based or may be another type. In one variation, the friction material 2 may have a plurality of fibers 4. The fibers 4 may include aramid fibers, carbon fibers, glass fibers, basalt fibers, polymer fibers or another similar functioning fiber material. The fibers 4 may be textile, natural or synthetic or may be another type. The fibers 4 may include animal, vegetable, or mineral fibers including, but not limited to, acrylic, aramid, carbon, cellulose, glass, mineral (engineered), polyimide, polyvinyl alcohol (PVA), Rayon, or may be another type. The fibers 4 may contain combinations of the above in varying concentrations with weight percentages of individual components at anywhere from 0-100% and the components may be intermixed. The friction material 2, fibers 4, or both or neither may be manufactured through weaving, knitting, braiding, plain weaving, satin weaving, stitching or may be manufactured in another way. The fibers 4 may be manufactured in a two dimensional or three dimensional orientation. The fibers 4 may be in a single layer or in multiple layers. The friction material 2, fibers 4, or both or neither may be formed through hand lay-up operation, an extrusion operation, a spray lay-up operation, a pultrusion operation, wet layup, chopper gun, a chopped strand mat, pressure bag moulding, autoclave moulding, polymeric liquid composite moulding, resin transfer moulding, vacuum assisted resin transfer moulding, bladder moulding, compression moulding, caul plate, mandrel wrapping, wet layup, chopper gun, filament winding, melting, staple fiber, continuous filament, or may be another type. The friction material 2, fibers 4, or both or neither may also be formed using resin transfer molding (RTM) processes or vacuum assisted resin transfer moulding (VARTM) processes or may be formed through a different method.

Further regarding FIG. 1, the friction material 2 may also have a plurality of particles 6. The particles 6 may be graphite particles, diatomaceous earth particles, silica particles, carbon particles, carbide particles, ceramic particles, cashew oil particles, rubber particles, nitride particles, nitrile particles, phenolic particles, zeolite particles, aramid particles, or may be another type. The diatomaceous earth particles may range in size from 1 to 40 µm. The graphite particles may range in size from 20 to 150 µm. The particles 6 may range in diameter from 50 to 150 µm. The particles 6 may range in diameter from 50 to 500 µm. The particles 6 may be spherical, oblong, cubical, polyhedral, irregularly shaped, or may be another type. The particles 6 may be uniformly distributed or aggregated throughout the friction material 2. The aggregation of the particles 6 may improve oil permeability of the friction material 2 that may be used for high speed or high energy applications or at low oil flow rates, which may be more abusive to friction materials. The diatomaceous earth particles and/or the graphite particles may be aggregated individually while the other may be uniformly distributed. The friction material 2 may be more resistant to localized extreme temperatures. The aggregation of particles 6 may isolate the particles 6 throughout the material and may open up space to create more interconnected pores in the friction material 2. The particles 6 may be aggregated into regions of groups of particles throughout the friction material wherein the amount and arrangement of regions of groups of particles results in an increase in average permeability of 2 to 10 times compared to a composition with single particles instead of regions of groups of particles. These regions may be random or patterned in the friction material 2. The regions of groups of particles may range in diameter from 10 to 150 µm. The regions of groups of particles may range in diameter from 10 to 500 µm. The particles 6 may range in diameter and adjusted as necessary to achieve the desired diameter size range of the groups of particles. The particles 6 may be bonded to other particles 6, fibers 2, a resin bonding agent 8, or a chemical binder 10. The groups of particles may be spherical, oblong, cubical, polyhedral, irregularly shaped, or may be another type.

Still referring to FIG. 1, the friction material 2 may further include a resin bonding agent 8. The bonding agent 8 may be held in contact with the fiber 4 or the particles 6 or any combination thereof. The bonding agent 8 may include epoxy resin, phenolic resin, modified phenolic resin, or silicone resin, or may be another type. The bonding agent 8 may be reactive or non-reactive.

Still referring to FIG. 1, the friction material 2 may further include a chemical binder 10. The chemical binder 10 may be held in contact with the fiber 4 or the particles 6, or the bonding agent 8, or any combination thereof. The chemical binder 10 may acrylonitrile, acrylate, polyvinyl acetate, polyvinyl chloride, or styrene-butadiene, or may be another type. The chemical binder 10 may be reactive or non-reactive. The chemical binder may include latex.

In one variation, the friction material 2 may have a weight percent range of between 20% and 60% of aramid fibers. Friction material 2 may have a weight percent range of between 5% and 20% of carbon fibers. Friction material 2 may have a weight percent range of between 5% and 25% of graphite particles. Friction material 2 may have a weight percent range of between 5% and 30% of diatomaceous earth particles. In some embodiments the particles 6 may have a weight percent range between 10 and 60% of the total weight of the friction material 2. In some embodiments the particles 6 may have a weight percent range between 15 and 50% of the total weight of the friction material 2. In some embodiments the particles 6 may have a weight percent range between 20 and 50% of the total weight of the friction material 2. The friction material 2 may have a carbon deposit. The friction material 2 may have aggregated particles 6. The particles 6 may be aggregated into regions of groups of particles throughout the friction material wherein the amount and arrangement of regions of groups of particles results in an increase in average permeability of 2 to 10 times compared to a composition with single particles instead of regions of groups of particles. These regions may be random or patterned in the friction material 2. The regions of groups of particles may range in diameter from 10 to 150 µm. The regions of groups of particles may range in diameter from 10 to 500 µm. The particles 6 may range in diameter and adjusted as necessary to achieve the desired diameter size range of the groups of particles. The particles 6 may be bonded to other particles 6, fibers 2, the resin bonding agent 8, or the chemical binder 10. The groups of particles may be spherical, oblong, cubical, polyhedral, irregularly shaped, or may be another type.

Figure 2:
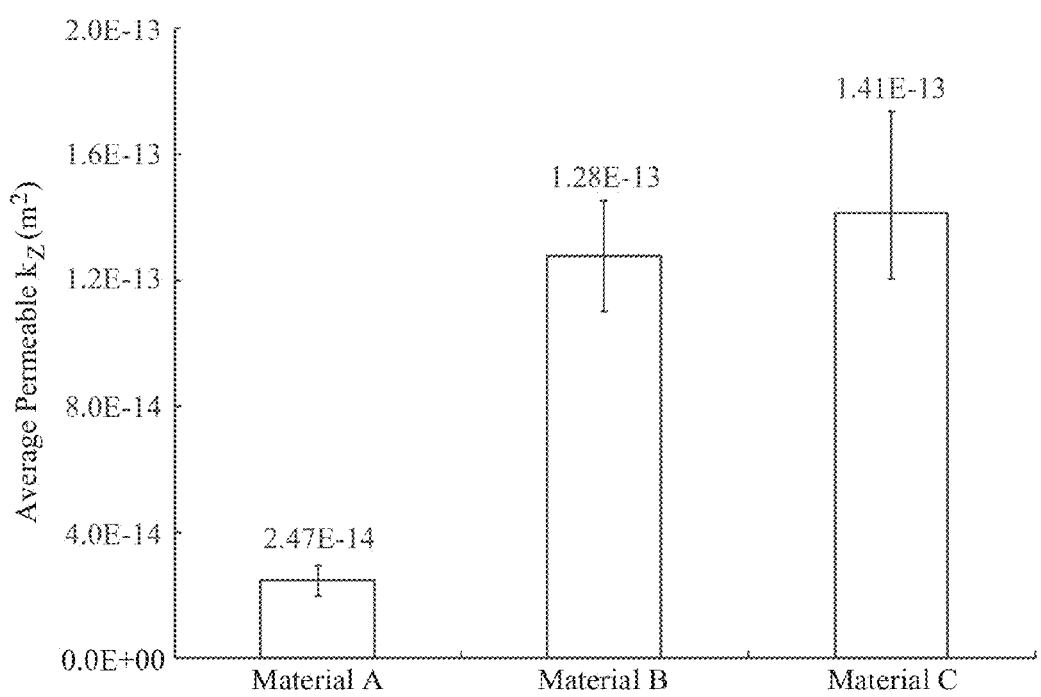
FIG. 2 is a comparison bar chart of the average permeability in the z-direction of saturated prior art friction material (A) and two variations of saturated friction material (B,C)

FIG. 2 shows a comparison bar chart of average permeability of transmission in the z-direction of saturated prior art friction material (A) and two variations (B, C) of the friction material 2. The friction material 2 may have an average permeability of 1.3E-13 $k_z$ m² or an average permeability of 1.4E-13 $k_z$ m². By comparison, the TAPPI test method T 460 was used to measure the air resistance (permeability) of the prior art friction material (A) and two variations (B, C) of the friction material before saturation. A densometer was used to measure the time it takes a fixed volume of air (400 cc) to pass through a standard area of material (6.45 cm²) under uniform pressure 1.22 kPa. The friction material 2 (B, C) may have a densometer reading of 5-8 seconds/400 cc when the friction material has a thickness of 0.57 mm. The non-aggregated prior art material (A) may have a densometer reading of 18-20 seconds/400 cc when the material has a thickness of 0.57 mm.

Figure 3:
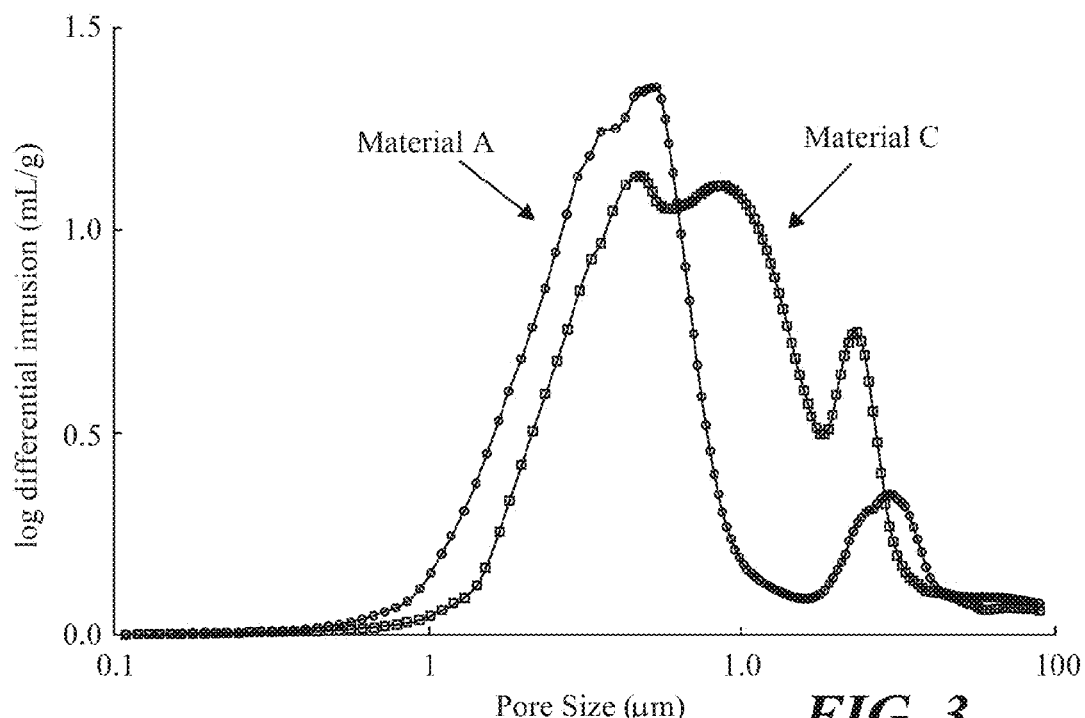
FIG. 3 is a comparison distribution plot of the pore size (µm) vs. log differential intrusion (mL/g) of prior art friction material (A) and a variation of the friction material (C)

FIG. 3 shows a comparison plot distribution of the pore size (µm) vs. log differential intrusion (mL/g) of prior art friction material (A) and a variation (C) of the friction material 2. The pore size may be characterized by mercury porosimetry. The friction material 2 may have pores 5-50 µm in size. The friction material 2 with aggregated particles 6 may include pores greater than 4 µm accounting for between 0 and 50% of the total pore volume. The friction material 2 without aggregated particles may include pores greater than 4 µm accounting for between 0 and 30% of the total pore volume.

Figure 4:
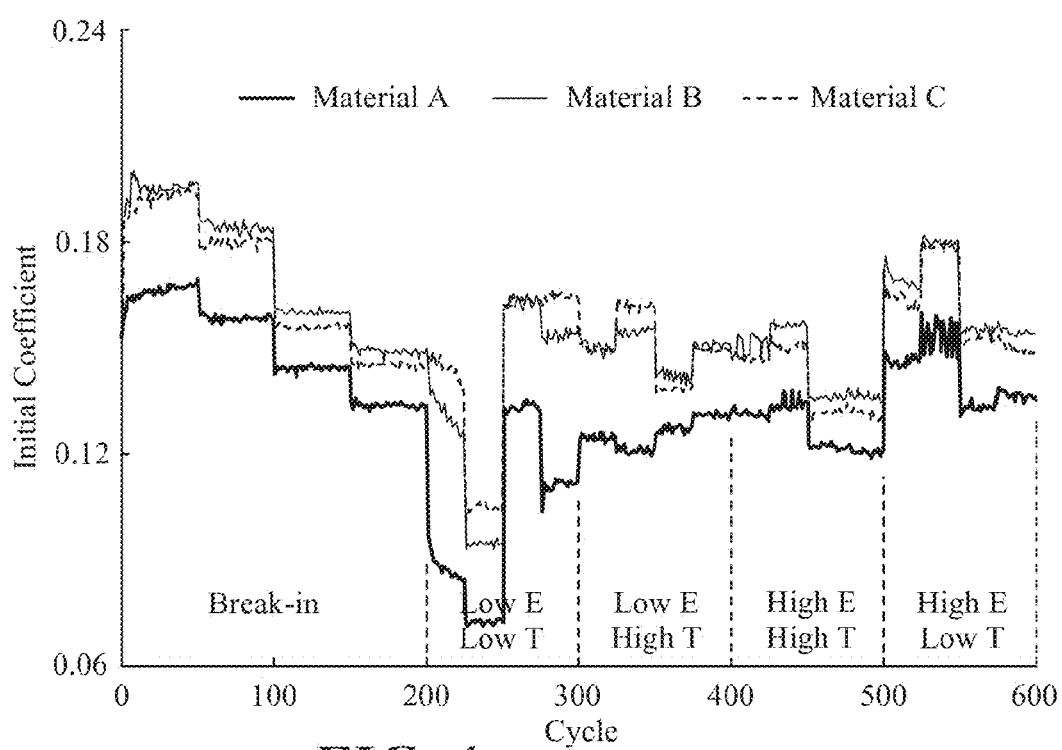
FIG. 4 is a comparison line chart of cycle vs. initial friction coefficient from a SAE J2490 (µPVT) friction test of prior art friction material (A) and two variations of the friction material (B,C)

FIG. 4 shows a comparison line chart of cycle vs. initial friction coefficient from a SAE J2490 (µDVT) friction test of prior art friction material (A) and two variations of friction material (B, C). The regions of Low T may be defined as temperatures at approximately 50° C. The regions of High T may be defined as temperatures at approximately 110° C. The regions of low E may be defined by areas where the kinetic energy ranges approximately from 2160 Joules to 8650 Joules. The regions of high E may be defined as regions where the kinetic energy ranges approximately from 28020 Joules to 47090 Joules.

Figure 5:
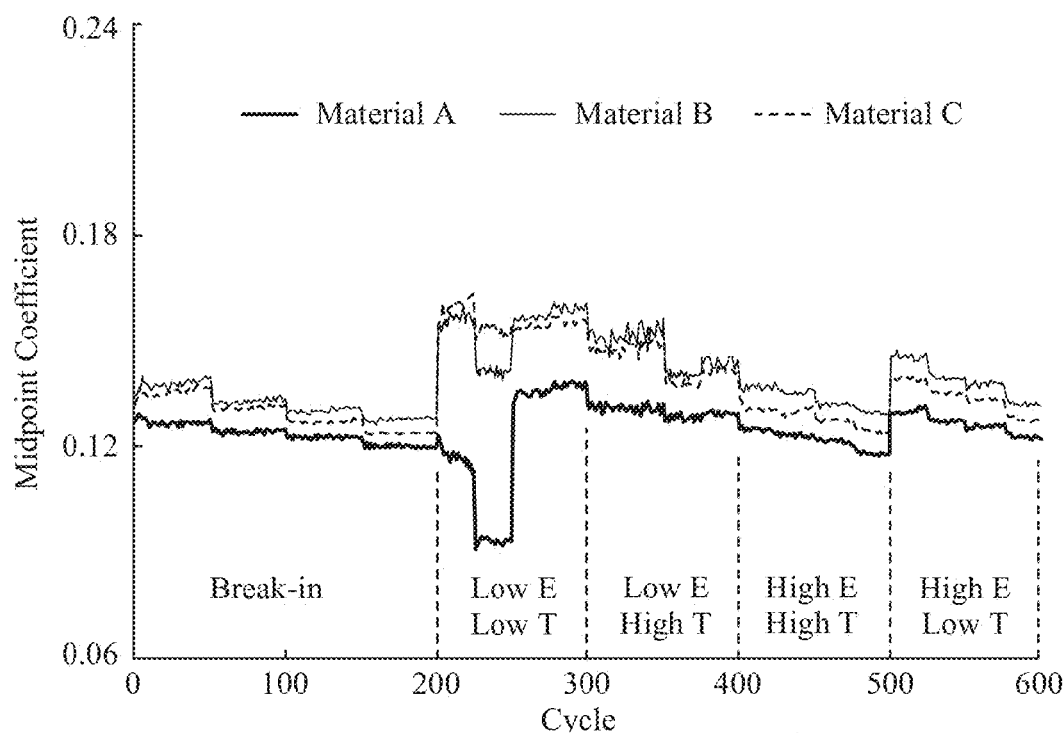
FIG. 5 is a comparison line chart of cycle vs. midpoint friction coefficient from a SAE J2490 (µPVT) friction test of prior art friction material (A) and two variations of the friction material (B,C)

FIG. 5 shows a comparison line chart of cycle vs. midpoint friction coefficient from a J2490 (µDVT) friction test of prior art friction material (A) and two variations of friction material (B, C). The regions of Low T may be defined as temperatures at approximately 50° C. The regions of High T may be defined as temperatures at approximately 110° C. The regions of low E may be defined by areas where the kinetic energy ranges approximately from 2160 Joules to 8650 Joules. The regions of high E may be defined as regions where the kinetic energy ranges approximately from 28020 Joules to 47090 Joules.

Figure 6:
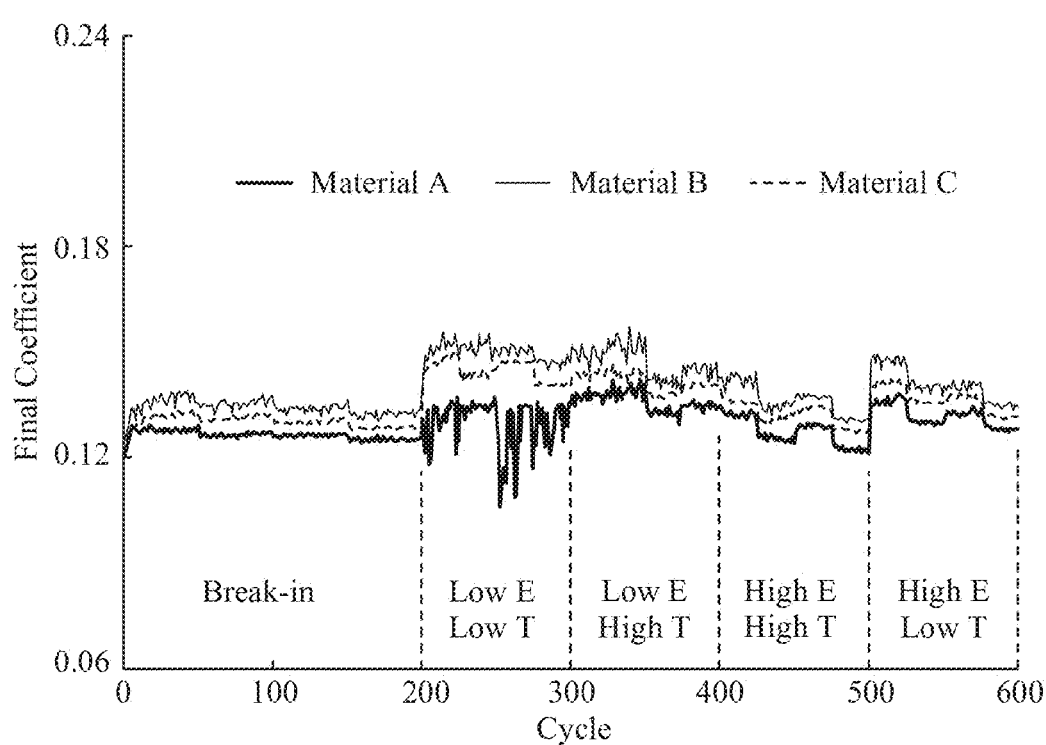
FIG. 6 is a comparison line chart of cycle vs. final friction coefficient from a SAE J2490 (µPVT) friction test of prior art friction material (A) and two variations of the friction material (B,C)

FIG. 6 shows a comparison line chart of cycle vs. final friction coefficient from a J2490 (µPVT) friction test of prior art friction material (A) and two variations of friction material (B, C). The regions of Low T may be defined as temperatures at approximately 50° C. The regions of High T may be defined as temperatures at approximately 110° C. The regions of low E may be defined by areas where the kinetic energy ranges approximately from 2160 Joules to 8650 Joules. The regions of high E may be defined as regions where the kinetic energy ranges approximately from 28020 Joules to 47090 Joules.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product including friction material including fibers, particles, and a resin bonding agent, wherein the particles are aggregated into regions of groups of particles throughout the friction material wherein the amount and arrangement of the regions of groups of particles results in an increase in average permeability of 2 to 10 times compared to a composition with single particles instead of regions of groups of particles.

Variation 2 may include a product as set forth in Variation 1 wherein said particles comprise at least one of graphite particles, diatomaceous earth particles, silica particles, carbon particles, carbide particles, ceramic particles, cashew oil particles, rubber particles, nitride particles, nitrile particles, phenolic particles, zeolite particles, or aramid particles.

Variation 3 may include a product as set forth in any of Variations 1-2 wherein said particles range in diameter from 10-500 μm.

Variation 4 may include a product as set forth in any of Variations 1-3 wherein said particles range in diameter from 10-150 μm.

Variation 5 may include a product as set forth in any of Variations 1-4 wherein said resin bonding agent includes at least one of epoxy resin, phenolic resin, modified phenolic resin, or silicone resin.

Variation 6 may include a product as set forth in any of Variations 1-5 wherein the fibers comprise at least one of acrylic, aramid, carbon, cellulose, glass, mineral (engineered), polyimide, polyvinyl alcohol (PVA), or Rayon.

Variation 7 may include a product as set forth in any of Variations 1-6 wherein said friction material further includes a chemical binder including at least one of acrylonitrile, acrylate, polyvinyl acetate, polyvinyl chloride, or styrene-butadiene.

Variation 8 may include a product as set forth in any of Variations 1-7 said particles comprise graphite particles ranging in size from 20 to 150 μm.

Variation 9 may include a product as set forth in any of Variations 1-8 wherein said particles comprise diatomaceous earth particles range in size from 1 to 40 μm.

Variation 10 may include a product as set forth in any of Variations 1-9 wherein said friction material includes pores ranging in size from 5-50 μm.

Variation 11 may include a product as set forth in any of Variations 1-10 wherein pores greater than 4 μm accounting for between 0% and 50% of the friction material's total pore volume.

Variation 12 may include a product including: a friction material including aramid fibers, carbon fibers, graphite particles, and diatomaceous earth particles, wherein the percentage weight of aramid fibers is between 20% and 60%, wherein the percentage weight of carbon fiber is between 5% and 20%, wherein the percentage weight of the graphite particles is between 5% and 25%, wherein the percentage weight of the diatomaceous earth particles is 5% to 30%, and wherein said at least one of the graphite particles or the diatomaceous earth particles are aggregated.

Variation 13 may include a product as set forth in Variation 12 wherein said diatomaceous earth particles range in size from 1 to 40 μm.

Variation 14 may include a product as set forth in any of Variations 12-13 wherein said graphite particles range in size from 20 to 150 μm.

Variation 15 may include a product as set forth in any of Variations 12-14 wherein said friction material includes pores ranging in size from 5-50 μm.

Variation 16 may include a product as set forth in any of Variations 12-15 wherein said friction material includes pores greater than 4 μm accounting for at least 50% of the friction material's total pore volume.

Variation 17 may include a product as set forth in any of Variations 12-16 wherein said at least one of the graphite particles or the diatomaceous earth particles are aggregated into regions of groups of particles throughout the friction material wherein the amount and arrangement of regions of groups of particles results in an increase in average permeability of 2 to 10 times compared to a composition with single particles instead of regions of groups of particles.

Variation 18 may include a product as set forth in any of Variations 12-17 wherein said friction material further includes a chemical binder including at least one of acrylonitrile, acrylate, polyvinyl acetate, polyvinyl chloride, or styrene-butadiene.

Variation 19 may include a product as set forth in any of Variations 12-18 wherein said friction material further includes a resin bonding agent including at least one of epoxy resin, phenolic resin, modified phenolic resin, or silicone resin.

Variation 20 may include a product as set forth in any of Variations 12-18 wherein at least one of the aramid fibers or the carbon fibers is manufactured through weaving, knitting, braiding, plain weaving, or satin weaving.

Variation 21 may include a product including a plurality of fibers, a resin bonding agent, and a plurality of bonded groups including a plurality of particles bonded together, wherein each of the plurality of bonded groups has a diameter ranging from 10-500 μm.

Variation 22 may include a product as set forth in Variation 21 wherein each of the plurality of bonded groups has a diameter ranging from 10-150 μm Variation 23 may include a product as set forth in Variation 21-22 wherein each of the plurality of bonded groups has an irregular shape.

Variation 24 may include a product as set forth in any of Variations 1-23 wherein the fibers are manufactured in a two dimensional or three dimensional orientation.

Variation 25 may include a product as set forth in any of Variations 1-24 wherein said fibers are formed through formed through hand lay-up operation, an extrusion operation, a spray lay-up operation, a pultrusion operation, wet layup, chopper gun, a chopped strand mat, pressure bag moulding, autoclave moulding, polymeric liquid composite moulding, resin transfer moulding, vacuum assisted resin transfer moulding, bladder moulding, compression moulding, caul plate, mandrel wrapping, wet layup, chopper gun, filament winding, melting, staple fiber, continuous filament, resin transfer molding (RTM) processes or vacuum assisted resin transfer moulding (VARTM) processes.

Variation 26 may include a product as set forth in any of Variations 1-25 wherein said friction material has an air resistance of between 5 and 8 sec/400 cc of air.

Variation 27 may include a product as set forth in any of Variations 1-26 wherein said particles are spherical, oblong, cubical, polyhedral, or irregularly shaped.

Variation 28 may include a product as set forth in any of Variations 1-27 wherein said chemical binder is reactive.

Variation 29 may include a product as set forth in any of Variations 1-28 wherein said fibers may be in multiple layers.

Variation 30 may include a product as set forth in any of Variations 1-29 wherein said friction material is used in a wet clutch of a vehicle.

Variation 31 may include a product as set forth in any of Variations 12-30 wherein diatomaceous earth particles and/or the graphite particles may be aggregated individually while the other may be uniformly distributed.

Variation 32 may include a product as set forth in any of Variations 1-31 wherein the particles may have a weight percent range between 15 and 50% of the total weight of the friction material.

Variation 33 may include a product as set forth in any of Variations 1-32 wherein the particles have a weight percent range between 20 and 50% of the total weight of the friction material.

Variation 34 may include a product as set forth in any of Variations 12-33 wherein the particles have a weight percent range between 10 and 60% of the total weight of the friction material.

Variation 35 may include a product as set forth in any of Variations 12-34 wherein the chemical binder further includes latex.

The above description of select examples of the invention is merely exemplary in nature and, thus, variations or variants thereof are not to be regarded as a departure from the spirit and scope of the invention.

What is claimed is:

1. A product comprising:
   friction material comprising:
   a plurality of fibers comprising aramid fibers, carbon fibers, and polyvinyl alcohol fibers consisting of vinyl alcohol repeat units;
   a plurality of particles comprising graphite particles and diatomaceous earth particles;
   a chemical binder comprising at least one of acrylonitrile, acrylate, polyvinyl acetate, or polyvinyl chloride; and
   a resin bonding agent,
   wherein the percentage weight of the aramid fibers is between 20% and 60% of the friction material,
   wherein the percentage weight of the carbon fibers is between 5% and 20% of the friction material,
   wherein the percentage weight of the graphite particles is between 5% and 25% of the friction material,
   wherein the percentage weight of the diatomaceous earth particles is 5% to 30% of the friction material,
   wherein the plurality of particles are aggregated into regions of groups of particles throughout the friction material,
   and
   wherein the friction material further comprises pores greater than 4 μm accounting for at least 50% of the total pore volume of the friction material.

2. The product of claim 1, wherein the plurality of fibers further comprise at least one of acrylic, cellulose, glass, mineral polyimide, or rayon.

3. The product of claim 1, wherein the graphite particles range in size from 20 to 150 mm.

4. The product of claim 1, wherein the diatomaceous earth particles range in size from 1 to 40 μm.

5. The product of claim 1, wherein the pores range in size from 5-50 μm.

6. The product of claim 1, wherein the resin bonding agent comprises at least one of epoxy resin, phenolic resin, modified phenolic resin, or silicone resin.

7. The product of claim 1, wherein the plurality of particles further comprise at least one of silica particles, carbon particles, carbide particles, ceramic particles, cashew oil particles, rubber particles, nitride particles, nitrile particles, phenolic particles, zeolite particles, or aramid particles.

8. The product of claim 7, wherein the plurality of particles range in diameter from 10 to 500 μm.

9. The product of claim 7, wherein the plurality of particles range in diameter from 10 to 150 μm.

10. The product of claim 1, wherein the groups of particles are a plurality of bonded groups comprising a plurality of particles bonded together, wherein each of the plurality of bonded groups has a diameter ranging from 10-500 μm.

11. The product of claim 10, wherein each of the plurality of bonded groups has a diameter ranging from 10-150 μm.

12. The product of claim 10, wherein each of the plurality of bonded groups has an irregular shape.

13. A product comprising:
    a friction material comprising:
    aramid fibers;
    carbon fibers;
    polyvinyl alcohol fibers consisting of polyvinyl alcohol repeat units;
    graphite particles;
    diatomaceous earth particles; and
    a chemical binder comprising at least one of acrylonitrile, acrylate, polyvinyl acetate, or polyvinyl chloride,
    wherein the percentage weight of the aramid fibers is between 20% and 60% of the friction material,
    wherein the percentage weight of the carbon fibers is between 5% and 20% of the friction material,
    wherein the percentage weight of the graphite particles is between 5% and 25% of the friction material,
    wherein the percentage weight of the diatomaceous earth particles is 5% to 30% of the friction material,
    wherein at least one of the graphite particles or the diatomaceous earth particles are aggregated, and
    wherein the friction material further comprises pores greater than 4 μm accounting for at least 50% of the total pore volume of the friction material.

14. The product of claim 13, wherein the diatomaceous earth particles range in size from 1 to 40 μm.

15. The product of claim 13, wherein the graphite particles range in size from 20 to 150 μm.

16. The product of claim 13, wherein the pores range in size from 5-50 μm.

17. The product of claim 13, wherein at least one of the graphite particles or the diatomaceous earth particles are aggregated into regions of groups of particles throughout the friction material.

18. The product of claim 13, wherein the friction material further comprises a resin bonding agent comprising at least one of epoxy resin, phenolic resin, modified phenolic resin, or silicone resin.

19. The product of claim 13, wherein the chemical binder further comprises latex.

20. The product of claim 13, wherein the aggregated particles are arranged into regions of groups of particles which range in diameter from 10 to 500 μm.

21. The product of claim 13, wherein the friction material further comprises at least one of silica particles, carbon particles, carbide particles, ceramic particles, rubber particles, nitride particles, nitrile particles, phenolic particles, zeolite particles, or aramid particles.

22. The product of claim 13, wherein the friction material further comprises polyimide fiber.

23. The product of claim 13, wherein the chemical binder comprises polyvinyl acetate.

24. The product of claim 13, wherein the chemical binder comprises polyvinyl chloride.

25. The product of claim 13, wherein the friction material further comprises cellulose fiber.

26. The product of claim 13, wherein the friction material further comprises glass fiber.

27. The product of claim 13, wherein the graphite particles or the diatomaceous earth particles are oblong, cubical, or polyhedral shaped.

* * * * *

UNITED STATES PATENT AND TRADEMARK OFFICE
CERTIFICATE OF CORRECTION

PATENT NO. : 9,677,635 B2
APPLICATION NO. : 13/953235
DATED : June 13, 2017
INVENTOR(S) : Jason Bares et al.

Page 1 of 1

It is certified that error appears in the above-identified patent and that said Letters Patent is hereby corrected as shown below:

In the Claims

Claim 2, Column 7, Line 61, please delete "mineral polyimide" and replace with -- mineral, polyimide --

Claim 13, Column 8, Line 27, after "consisting of", please delete "polyvinyl alcohol repeat" and replace with -- vinyl alcohol repeat --

Signed and Sealed this
Tenth Day of October, 2017

Joseph Matal
*Performing the Functions and Duties of the*
*Under Secretary of Commerce for Intellectual Property and*
*Director of the United States Patent and Trademark Office*